United States Patent
Nothofer et al.

(10) Patent No.: US 6,811,356 B2
(45) Date of Patent: Nov. 2, 2004

(54) CABLE AND METHOD FOR LAYING IN PLASTIC TUBES

(75) Inventors: Klaus Nothofer, Erkrath (DE); Hans-Detlef Leppert, Mönchengladbach (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/285,436

(22) Filed: Nov. 1, 2002

(65) Prior Publication Data

US 2003/0084950 A1 May 8, 2003

(30) Foreign Application Priority Data

Nov. 2, 2001 (EP) .............................. 01440372

(51) Int. Cl.$^7$ ................................ F16L 7/00
(52) U.S. Cl. ............................ 405/183.5; 405/154.1; 405/184.1; 405/184.3; 137/15.12; 137/318
(58) Field of Search .................. 405/154.1, 183.5, 405/184.1–184.5; 137/317, 318, 15.01, 15.08, 15.12, 15.13, 15.14; 138/97, 98, 137, 138, 140, 155; 254/134.3 R, 134.3 FT, 134.4

(56) References Cited

U.S. PATENT DOCUMENTS

| | | | |
|---|---|---|---|
| 4,641,774 A | * | 2/1987 | Krawchuk et al. ............ 228/2.5 |
| 4,856,937 A | * | 8/1989 | Grocott et al. ............ 405/183.5 |
| 5,121,644 A | * | 6/1992 | Grey et al. ............... 254/134.4 |
| 5,788,414 A | * | 8/1998 | Gordon .................... 405/154.1 |
| 5,971,035 A | * | 10/1999 | Griffioen ..................... 138/155 |
| 6,198,871 B1 | * | 3/2001 | Gregor et al. ............... 385/147 |
| 6,200,068 B1 | * | 3/2001 | Bath et al. ................ 405/154.1 |
| 6,286,542 B1 | * | 9/2001 | Morain et al. ............... 405/156 |
| 6,536,463 B1 | * | 3/2003 | Beals et al. ............... 405/154.1 |

FOREIGN PATENT DOCUMENTS

| | | | |
|---|---|---|---|
| DE | 3001226 | * | 8/1980 |
| DE | 3001226 A1 | | 8/1980 |
| DE | 3140928 A1 | | 5/1983 |
| DE | 29722107 U1 | | 3/1998 |
| DE | 19734274 A1 | | 2/1999 |
| DE | 19811955 A1 | | 9/1999 |
| DE | 19932581 A1 | | 1/2001 |
| JP | 02101911 | * | 4/1990 .......... 254/134.3 R |

* cited by examiner

Primary Examiner—Jong-Suk Lee
(74) Attorney, Agent, or Firm—Sughrue Mion, PLLC

(57) ABSTRACT

A cable for laying in plastic tubes for transporting gas or water is described that comprises a cable core assembly and a plastic sheath surrounding the cable core assembly, in which cable the plastic used for the plastic tube and the plastic for the sheath can be welded together.

9 Claims, 1 Drawing Sheet

CABLE AND METHOD FOR LAYING IN PLASTIC TUBES

CABLE AND METHOD FOR LAYING IN PLASTIC TUBES

DESCRIPTION

The invention is based on a priority application EP 01 440 372.9 which is hereby incorporated by reference.

The invention relates to a cable for laying in plastic tubes which transport gas or water, comprising a cable core assembly and also a plastic sheath surrounding the cable core assembly and also to a method of laying a cable for transmitting information items in a tube composed of plastic for conveying liquid or gaseous media.

In the course of the installation of new telecommunications cables systems by regional and communal companies, thought is increasingly being given to alternative solutions to the conventional laying of telecommunications cables directly in the ground for economical and/or organizational reasons. An alternative laying procedure for telecommunications cables that suggests itself, in particular, for economic reasons, is the use of gas and water pipelines present in the pipe network or channel network of a supply system of a town or a built-up area. Such a solution is described in DE 30 01 226 A1. In addition to the reduction in the costs of constructing an urban or regional telecommunications network, only small-scale excavation work is necessary as a result of using the existing pipelines, with the result that narrow traffic space is often less impaired, in particular, in towns. In addition, with this new laying technology, the route occupation, which is already dense in many cases, by pipelines of all the supply and waste-disposal sectors does not present any substantial problem, but may even be advantageous.

To construct a telecommunications network using optical cables having a comparatively small external diameter, including the link-up facility for subscribers to be connected later, the laying of optical communications cables, for example in fresh water pipelines of the existing supply network therefore suggests itself for technical and organizational reasons and also for reasons of rights of way. In this connection, it is necessary to take particular care when the cable is introduced into the pipeline so that no nucleation or other microbiological contaminations occur in the pipeline.

An additional difficulty in the laying of cables in drinking water pipelines is that sliding valves or other shut-off devices for shutting off the fresh-water pipeline are disposed at intervals of about 150 to 250 m in the drinking water pipelines. At these shutoff points, the cable has to be routed round the sliding valve without any impairments of a mechanical or optical nature by bringing the cable out of the tubular pipeline upstream of the sliding valve and re-introducing it again into the tubular pipeline downstream of the sliding valve. In addition, it is also necessary for the creation of subscriber connections or branches to bring an optical cable out of the tubular pipeline or to introduce it into the tubular pipeline.

DE 297 22 107 U discloses a device for introducing and/or bringing a cable into or out of a tubular pipeline, a flange-type housing being attached to the pipeline. The cable is sealed from the housing by annular sealing elements. The inner bore of the sealing elements is dimensioned in such a way that the cable can be fed through with easy movement. The sealing takes place by axially clamping the sealing elements, the latter pressing both against the cable and against the internal wall of the housing. The sealing elements are accordingly composed of an elastic material, for example rubber.

This type of sealing is suitable for pressures of up to 15 bar, but at higher pressures, the necessary safety no longer exists. In addition, there must be a worry that, in the case of a pipeline for transporting gas, the gas may diffuse through the sealing elements.

This type of introduction and bringing out of cables has proved satisfactory, but it is very expensive.

SUMMARY OF THE INVENTION

The object of the present invention is to provide a cable that can be introduced into and brought out of plastic tubes that are used for transporting gas or water. As a result, it should be possible to render the known laying methods more inexpensive.

Further advantageous refinements are covered in the subclaims.

The important advantage of the invention is to be perceived in that a cable for transmitting information can easily be introduced into and brought out of a plastic tube and that the point of introduction and of bringing out is outwardly sealed safely and permanently.

The invention is applicable, in particular, in gas and drinking water distribution networks. The tubes used for this purpose are mostly composed of metal, but tubes of HDPE (PE 100 and PE 80) are increasingly being used.

If the plastic material for the sheath is too hard and the flexibility of the cable would thereby suffer, it has proved advantageous in a development of the invention to construct the sheath of two layers, the inner layer tending to be soft, for example composed of LDPE, and the outer layer being weldable to the plastic tube, for example composed of HDPE. It may also be advantageous to take LLDPE as sheath material since this material is readily bendable and has a melting point that is in the vicinity of the melting point of HDPE.

In order to improve the weldability of the cable, it is advantageous that the sheath or the outer layer has been corona-treated.

The cable sheath is welded to the bore or to the tube connecting piece by the heated tool welding method already used in the case of plastic tubes for transporting gas or water.

BRIEF DESCRIPTION OF THE DRAWINGS

The invention is explained in greater detail by reference to the exemplary embodiments shown diagrammatically in FIGS. 1 and 2.

DETAILED DESCRIPTION OF THE EMBODIMENT

Figure 1:
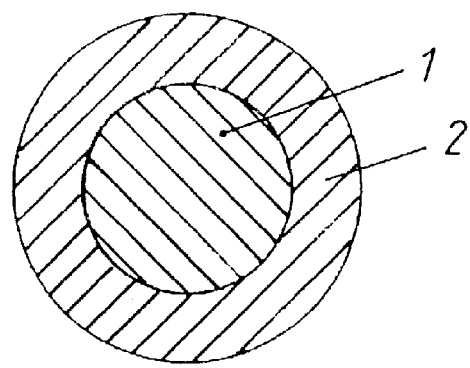
FIG. 1 shows a section through a cable according to the teaching of the invention, in which 1 denotes the cable core assembly, e.g. a multiplicity of optical waveguides and 2 denotes the cable sheath, which is intended to be weldable to a plastic tube.

FIG. 1 shows a section through a cable according to the teaching of the invention, in which 1 denotes the cable core assembly, e.g. a multiplicity of optical waveguides and 2 denotes the cable sheath, which is intended to be weldable to a plastic tube.

If the cable is to be fed through the wall of an HDPE tube for transporting gas or water, the sheath 2 is likewise composed of HDPE or LLDPE, in which connection LLDPE should be preferred since HDPE is less suitable as a material for the sheath 2 because of its rigidity. In order to improve the weldability of the sheath to the plastic tube, the surface of the sheath 2 is corona-treated.

Figure 2:
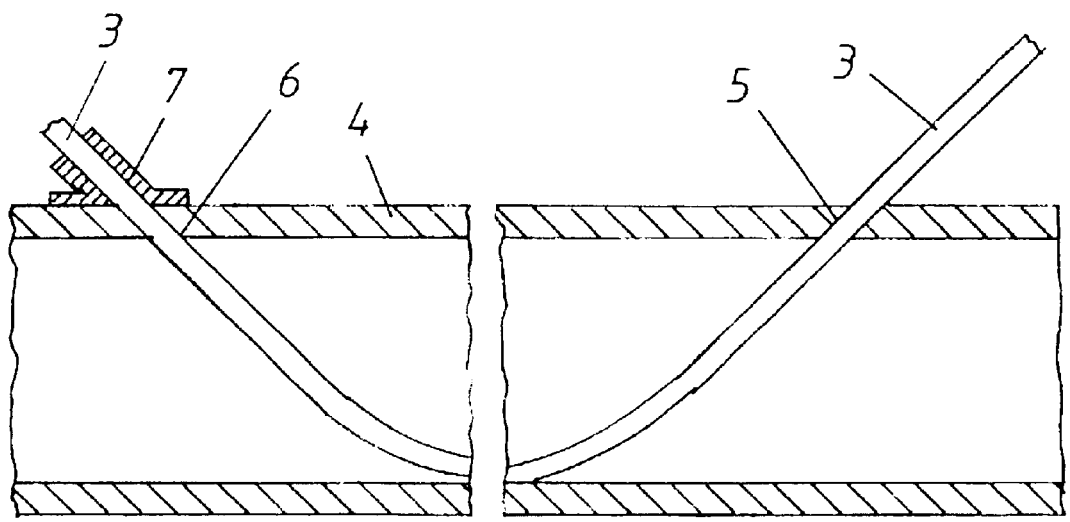
FIG. 2 shows a section through a plastic tube into which and out of which cable is introduced or brought out, respectively.

FIG. 2 shows a section through a plastic tube into which and out of which cable is introduced or brought out, respectively.

In the right-hand half of FIG. 2, a bore 5 is introduced into the wall of the plastic tube 4 obliquely to the longitudinal direction of the plastic tube 4, through which bore the cable 3 is introduced into the interior of the plastic tube 4. After pulling the cable 3 in, the sheath 2 of the cable 3 is welded to the internal wall of the bore 5 by applying heat, for example by means of a heated wedge, which is not shown.

In the left-hand half of FIG. 2, a tube connecting piece 7 is welded to the wall of the plastic tube 4 in the region of a second bore 6 as an alternative solution, the bore of the tube connecting piece 7 being in line with the second bore 6. The cable 3 can be brought out of the plastic tube 4 through the second bore 6 and the tube connecting piece 7. Finally, the sheath 2 of the cable 3 is welded to the tube connecting piece 7, which is composed of the same plastic as the plastic tube.

Such tube connecting pieces are known as so-called tapping connecting pieces and, prior to the tapping of the wall of the plastic tube, are welded onto it and the bore is then produced by feeding a drill through the internal opening of the tube connecting piece and the bore is produced in the tube wall.

It is essential for the invention that the internal diameter of the bore 5 or also the bore 6 of the tube connecting piece 7 is approximately equal to the external diameter of the cable 3.

What is claimed is:

1. A method of laying a cable for transmitting information items in a tube composed of plastic for conveying liquid or gaseous media, wherein said method comprises the steps of:

a) introducing a bore into the wall of the plastic tube,
    b) feeding a cable having a cable core assembly and a plastic sheath through the bore,
    c) introducing the cable into the plastic tube by means of at least one of a traction cable and fluid pressure, and
    d) welding the plastic sheath of the cable finally to the bore,
       wherein a plastic tube connecting piece is welded onto the plastic tube in the region of the bore and the cable sheath is welded to the tube connecting piece after the cable has been pulled into the tube.

2. A method according to claim 1, wherein the bore or the tube connecting piece is provided at an angle of 30 to 60° with respect to the longitudinal axis of the plastic tube.

3. A method according to claim 1, wherein the bore is introduced into the wall obliquely to a longitudinal direction of the tube.

4. A method according to claim 1, wherein the plastic sheath is welded to the bore with the application of heat.

5. A method according to claim 1, further comprising the steps of:

welding a tube connecting piece to the wall of the tube;
    introducing a second bore into the wall of the tube in line with said tube connecting piece; and
    exiting the cable and the plastic sheath through the second bore and the tube connecting piece.

6. A method according to claim 5, wherein the plastic sheath is welded to the tube connecting piece.

7. A method according to claim 5, wherein a diameter of the second bore is made approximately equal to an external diameter of the cable.

8. A method according to claim 5, wherein said second bore is made after said tube connecting piece is welded to said wall.

9. A method according to claim 1, wherein a diameter of the bore is made approximately equal to an external diameter of the cable.

* * * * *